United States Patent
Zeng et al.

(10) Patent No.: US 9,830,270 B2
(45) Date of Patent: Nov. 28, 2017

(54) OPTIMIZED MEMORY LAYOUT THROUGH DATA MINING

(71) Applicant: GM GLOBAL TECHNOLOGY OPERATIONS LLC, Detroit, MI (US)

(72) Inventors: Shuqing Zeng, Sterling Heights, MI (US); Shige Wang, Northville, MI (US); Stephen G. Lusko, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 14/951,656

(22) Filed: Nov. 25, 2015

(65) Prior Publication Data

US 2017/0147495 A1   May 25, 2017

(51) Int. Cl.
G06F 12/08       (2016.01)
G06F 12/0868    (2016.01)

(52) U.S. Cl.
CPC .. G06F 12/0868 (2013.01); *G06F 2212/1008* (2013.01); *G06F 2212/281* (2013.01); *G06F 2212/452* (2013.01)

(58) Field of Classification Search
CPC ............. G06F 11/3636; G06F 11/3466; G06F 11/3471; G06F 2212/452; G06F 2212/1008
See application file for complete search history.

(56) References Cited

U.S. PATENT DOCUMENTS

| | | | | |
|---|---|---|---|---|
| 5,889,999 A * | 3/1999 | Breternitz, Jr. | .......... | G06F 8/445 712/201 |
| 6,947,052 B2 * | 9/2005 | Jeremiassen | .......... | G06F 8/4442 345/541 |

* cited by examiner

*Primary Examiner* — Gary W Cygiel
(74) *Attorney, Agent, or Firm* — Quinn IP Law

(57) ABSTRACT

A method of ordering memory access by an instruction cache of a central processing unit on a global memory device. A signal list of a link map file is extracted in the global memory device. Memory access traces relating to executed tasks are accessed from the signal list. Memory locations accessed in the global memory device from the access traces are identified. A correlation value for each pair of memory locations accessed in the global memory device is determined. Correlation values of the pairs of memory locations are determined, wherein the correlation values are computed based on a proximity of executable instructions utilizing the respective pair of memory locations. Accessed memory locations within the global memory device are reordered as a function of the determined correlation values. An executable file accessing the global memory device is modified.

11 Claims, 3 Drawing Sheets

|  | $S_c$ | $S_a$ | $S_b$ | $S_g$ | $S_f$ | $S_h$ | $S_e$ | $S_d$ | |
|---|---|---|---|---|---|---|---|---|---|
| $S_a$ | $W_{ca}$ | $W_{aa}$ | $W_{ba}$ | $W_{ga}$ | $W_{fa}$ | $W_{ha}$ | $W_{ea}$ | $W_{da}$ | |
| $S_f$ | $W_{cf}$ | $W_{af}$ | $W_{bf}$ | $W_{gf}$ | $W_{ff}$ | $W_{hf}$ | $W_{ef}$ | $W_{df}$ | |
| $S_b$ | $W_{cb}$ | $W_{ab}$ | $W_{bb}$ | $W_{db}$ | $W_{fb}$ | $W_{hb}$ | $W_{eb}$ | $W_{db}$ | |
| $S_d$ | $W_{cd}$ | $W_{ad}$ | $W_{bd}$ | $W_{gd}$ | $W_{fd}$ | $W_{hd}$ | $W_{ed}$ | $W_{dd}$ | Correlation Matrix |
| $S_e$ | $W_{ce}$ | $W_{ae}$ | $W_{be}$ | $W_{ge}$ | $W_{fe}$ | $W_{he}$ | $W_{ee}$ | $W_{de}$ | |
| $S_c$ | $W_{cc}$ | $W_{ac}$ | $W_{bc}$ | $W_{gc}$ | $W_{fc}$ | $W_{hc}$ | $W_{ec}$ | $W_{dc}$ | |
| $S_h$ | $W_{ch}$ | $W_{ah}$ | $W_{bh}$ | $W_{gh}$ | $W_{fh}$ | $W_{hh}$ | $W_{eh}$ | $W_{dh}$ | |
| $S_g$ | $W_{cg}$ | $W_{ag}$ | $W_{bg}$ | $W_{gg}$ | $W_{fg}$ | $W_{hg}$ | $W_{eg}$ | $W_{dg}$ | |

|  | $S_c$ | $S_a$ | $S_b$ | $S_g$ | $S_f$ | $S_h$ | $S_e$ | $S_d$ |
|---|---|---|---|---|---|---|---|---|
| $S_a$ | $W_{ca}$ | $W_{aa}$ | $W_{ba}$ | $W_{ga}$ | $W_{fa}$ | $W_{ha}$ | $W_{ea}$ | $W_{da}$ |
| $S_f$ | $W_{cf}$ | $W_{af}$ | $W_{bf}$ | $W_{gf}$ | $W_{ff}$ | $W_{hf}$ | $W_{ef}$ | $W_{df}$ |
| $S_b$ | $W_{cb}$ | $W_{ab}$ | $W_{bb}$ | $W_{db}$ | $W_{fb}$ | $W_{hb}$ | $W_{eb}$ | $W_{db}$ |
| $S_d$ | $W_{cd}$ | $W_{ad}$ | $W_{bd}$ | $W_{gd}$ | $W_{fd}$ | $W_{hd}$ | $W_{ed}$ | $W_{dd}$ |
| $S_e$ | $W_{ce}$ | $W_{ae}$ | $W_{be}$ | $W_{ge}$ | $W_{fe}$ | $W_{he}$ | $W_{ee}$ | $W_{de}$ |
| $S_c$ | $W_{cc}$ | $W_{ac}$ | $W_{bc}$ | $W_{gc}$ | $W_{fc}$ | $W_{hc}$ | $W_{ec}$ | $W_{dc}$ |
| $S_h$ | $W_{ch}$ | $W_{ah}$ | $W_{bh}$ | $W_{gh}$ | $W_{fh}$ | $W_{hh}$ | $W_{eh}$ | $W_{dh}$ |
| $S_g$ | $W_{cg}$ | $W_{ag}$ | $W_{bg}$ | $W_{gg}$ | $W_{fg}$ | $W_{hg}$ | $W_{eg}$ | $W_{dg}$ |

} Correlation Matrix

Fig. 2

OPTIMIZED MEMORY LAYOUT THROUGH DATA MINING

BACKGROUND OF INVENTION

An embodiment relates to memory allocation.

A central processing unit (CPU) utilizes cache that loads data stored in random access memory (RAM) for use by the central processing unit. Cache offers a quick solution to reading and writing data locally as opposed to reading from and writing data to RAM. Cache maintains in its storage data that is most often utilized.

The CPU includes instructions when executing code as to what addresses will be used to store data. Memory layouts of the respective address locations affect the memory bandwidth for cache enabled architecture for an electronic control unit (ECU). For example, if the memory layout is incorrectly designed (e.g., inefficient), slowdowns may occur in retrieving data particularly for those locations repetitiously utilized in RAM as memory allocation is predetermined for a respective executed stream of instructions. Slow CPU operations will result if the CPU has to access various locations of memory within the RAM. That is, if the memory allocation is not efficiently organized, then CPU processing times will be inefficient as well. Memory layouts affect the memory bandwidth for cache enabled architecture for the CPU. If a memory layout of the RAM as accessed by the executable instructions is inefficiently designed, bottlenecks in retrieving data may occur if the tasks have to constantly access various locations of the RAM.

SUMMARY OF INVENTION

An advantage of an embodiment is optimizing memory layout when accessing random access memory (RAM). Central processing units (CPU) utilize cache stored data in random access memory for read/write data that is most often used by the CPU. Hardware implements RAM as a block of memory for temporary storage of data processed by the CPU. The data stored in cache and RAM may be data utilized from a previous computing operation or a new operation. When the to-be-processed data is not in cache, the system loads another block of data in RAM to replace a block of cache. The techniques described herein identifies pairs of signal variables that will utilize memory locations of the RAM that are executed in close proximity to one another (i.e., executable instructions substantially adjacent to one another) and assigns adjacent memory locations to the signal variables in close proximity to one another. In this manner, in knowing that two memory locations will be accessed substantially frequently and substantially sequentially, assigning the signal variables to memory locations close to one another reduces the processing time of the CPU attempting to replace cache blocks. As a result, the technique herein efficiently assigns memory layouts to respective signal variables so that those respective pairs of signal variables that are accessed frequently and commonly are assigned memory locations in the RAM close to one another as accessed by the RAM. This improves the efficiency of the CPU and reduces bottlenecks.

An embodiment contemplates a method of ordering memory access by an instruction cache of a central processing unit on a global memory device. A signal list of a link map file extracted in the global memory device. Memory access traces are obtained relating to executed tasks from the signal list. Memory locations accessed in the global memory device are identified from the access traces. A correlation value is determined for each pair of memory locations accessed in the global memory device. The correlation values are computed based on a proximity of executable instructions utilizing the respective pair of memory locations. Accessed memory locations are reordered within the global memory device as a function of the determined correlation values. An executable file accessing the global memory device is modified. The executable file optimizing the memory layout when accessing the global memory device.

BRIEF DESCRIPTION OF DRAWINGS

FIG. 2 is an exemplary weighted correlation matrix.

DETAILED DESCRIPTION

Figure 1:
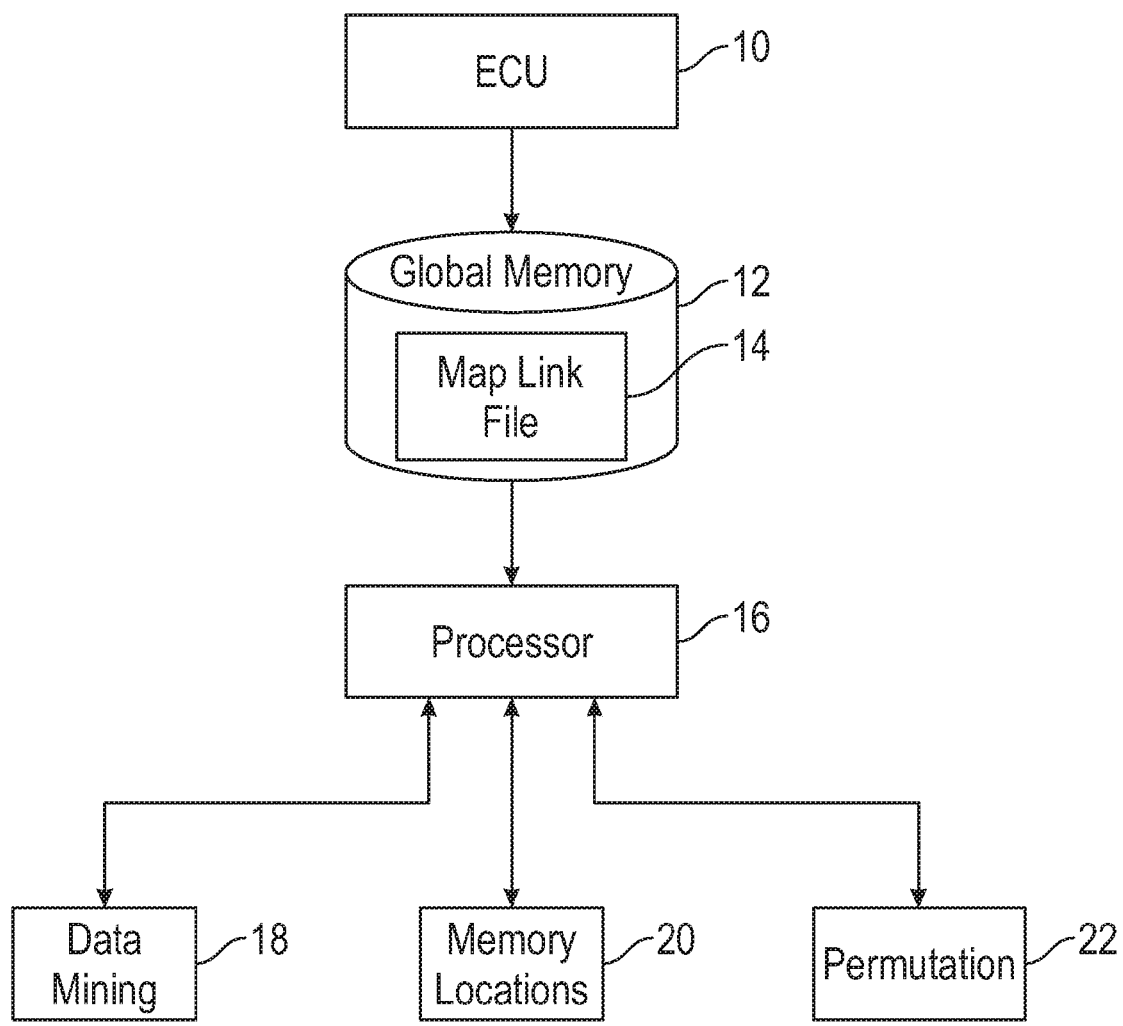
FIG. 1 is a block diagram of hardware used to optimize task partitioning.

FIG. 1 is a block diagram of hardware used to optimize memory layout. Respective algorithms executing application codes are executed on an electronic control unit (ECU) 10. The algorithms executed are those programs that would be executed in production (e.g., vehicle engine control, computers, games, factory equipment, or any other electronic controls that utilizes an electronic control unit). Data is written and read to/from various addresses within a global memory device 12 (e.g., random access memory).

A map link file 14 is a text file that details where data and code is stored inside the executables within the global memory device 12. The map link file 14 includes trace files that contain an event log describing what transactions have occurred within the global memory device 12 as well as where code and data are stored. As a result, a link file map 14 may be obtained for identifying all the signals and the associated memories addresses that were accessed when the executable instructions are executed by the ECU 10.

A mining processor 16 is used to perform data mining 18 from the global memory device 12, reordering associated memory locations 20, determining a minimum energy function associated with a permutation 22 for identifying an optimum memory layout which signal variables may be assigned to for reading and writing data.

An instruction execution stream includes code (i.e., executable code) that is executed by the ECU 10. The code includes an address location within the global memory device 12 that is accessed for either writing or retrieving data from the respective address locations. An exemplary instruction stream for loading instructions may have the format as follows:

ADDR $X$-LD $\#_{Sa}, R_x$.

An exemplary instruction stream for writing instructions to an address in the global memory device 12 may have the format as follows:

ADDR $Y$-WR $R_x, \#_{Sb}$, where $s_a$ and $s_b$ represent signal variables of the executable instructions that identify the memory locations that are accessed for writing or reading data within the global memory device 12. For all signal variables $\{s_i | i=1, \ldots, N\}$, a correlation matrix W is constructed identifying a correlation between all signal variables. Each of the signal variables is listed on a vertical side of the correlation matrix W and a horizontal side of the correlation matrix W for cross comparison. A correlation factor w is determined for each respective pair of variables. For example, for signal variables $s_a$, and $s_b$, a correlation factor $w_{ab}$ is at the cross section of the two signal variables in the correlation matrix W. Those pairs of signal variables that are substantially adjacent instructions in the i-cache will produce a larger correlation value w in comparison to pairs of signal variables not close to one another. A respective pair of signal variables referenced by adjacent instructions in an instruction execution stream indicates that these respective signal variables executed close in time to one another in the executable code are given a higher correlation value in the correlation matrix W. Therefore, a respective pair of signal variables that are executed in adjacent instructions will have a larger correlation factor w in comparison to a respective pair of signal variables that are executed in instructions further spaced apart.

FIG. 2 represents an exemplary correlation matrix W. The signal variables are labeled both horizontally (e.g., rows) and vertically (e.g., columns) in the correlation matrix W. As shown, for all signal variables $\{s_i | i=a, \ldots, N\}$, with example signal variables a, b, c, d, e, f, and g shown in FIG. 2, a correlation value is entered for each respective pair of signal variables. Those signal variables executed closer to one another in the instruction execution scheme generates a larger correlation value. In addition, those respective pairs of signal variables more frequently referenced will further increase the correlation value.

The correlation value may be normalized as a function of the proximity of a pair of signal variables within the instruction execution stream. The following is an exemplary function for normalizing correlation values:

if $|ADDR\ X - ADDR\ Y| < 1K$, $w_{ab} = w_{ab} + 1$.

As shown in the function above, correlation values are normalized if their difference is less than 1K; however, it should be understood that the size of the comparative value of 1K is exemplary and other values may be used which may be dependent on various factors such as the instruction cache size.

After the correlation matrix W is generated, the correlation matrix W is reordered to identify a permutation that can be input to a minimum energy function for sorting, which assists in identifying an efficient memory layout. To reorder the correlation matrix W, the position of the respective signals in the correlation matrix W must be permuted. Initially, signal variables of the correlation matrix W should be repositioned such that all the diagonal entries of the correlation matrix W have a zero value. Next, the correlation values that are highest among all the correlation values of the correlation matrix W should be closest to the diagonal line represented by the zero value entries of the correlation matrix W. The signal variables of the correlation matrix are also repositioned to account for the reordering of the correlation values. As a result, those correlation values that have the highest correlation values are positioned closer to the zero diagonal line with decreasing correlation values being placed outward from the zero diagonal line.

After the correlation values and associated signal variable are repositioned, the permutated correlation matrix W is input to the minimum energy function as described below.

With respect to correlation matrix W, the desired ordering of memory locations is achieved through finding a permutation $\{\pi_1, \ldots, \pi_N\}$ of vertices such that adjacent vertices are the most correlated. The selected permutation indicates that the frequent accessed data by the same set of tasks can be fit in a local data cache. Mathematically, the desired reordering permutation can be express as the following minimum energy function:

$$\min J(\pi) = \Sigma_{l=1}^{N-1} l^2 \Sigma_{i=1}^{N-l} w_{\pi_i, \pi_{i+l}}.$$

This is equivalent to finding the inverse permutation $\pi^{-1}$ such that the following energy function is minimized:

$$\min_{\pi^{-1}} J(\pi^{-1}) = \sum_{a,b} (\pi_a^{-1} - \pi_b^{-1})^2 w_{ab}$$

Solving the above problem is approximated by computing the eigenvector ($q_2$) with the second smallest eigenvalue for the following eigen equation:

$$(D-W)q = \lambda D q$$

where the Laplacian matrix is L=D−W, the degree matrix D is a diagonal defined as $$d_{ij} = \begin{cases} \sum_i w_{ij}, & i=j \\ 0, & \text{Otherwise} \end{cases}.$$

The thus-obtained $q_2$ is then sorted in ascending order. The index of the vertices after sorting is the desired permutation $\{\pi_1, \ldots, \pi_N\}$. The order of memory locations may then be derived from this permutation by rearranging the memory locations according to the permutation result.

Figure 3:
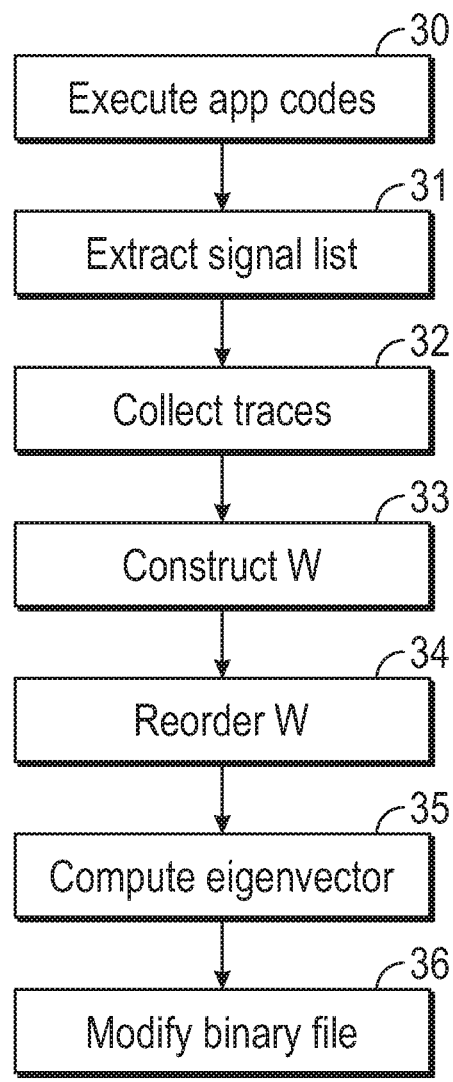
FIG. 3 is a flowchart of a method for optimizing memory layout.

FIG. 3 illustrates a flowchart of the technique for optimizing memory layout of the global memory device as accessed by the ECU. In step 30, application codes for a software program are executed by the tasks of a respective ECU. Both read and write operations are executed in the global memory device (e.g., memory not on the mining processor).

In step 31, a signal list is extracted from a link map file in a global memory by a mining processor. The signal list identifies traces of memory locations hit by the tasks executed by the executable instructions.

In step 32, the memory access traces are collected by the mining processor.

In step 33, a correlation matrix W is constructed that includes correlation values for pairs of signal variables that identify a degree as to which respective memory locations are frequently accessed data by the same set of tasks in a local instruction cache. Each respective pair of signal variables will be assigned a correlation value. The correlation value may thereafter be normalized depending whether the addresses of the respective signal variables are within a predetermined size. The correlation value may also be based on the frequency that the respective pair of signal variables are executed in the executable instruction stream.

In step 34, the correlation matrix is reordered such that higher correlation values among the plurality of correlation values in the correlation matrix W are placed closer to the zero diagonal line of the matrix. Remaining correlation values decreasing in value are placed in the correlation matrix outward from the zero diagonal line in decreasing order.

In step 35, the permutated correlation matrix is input to the minimum energy function for computing the eigenvector ($q_2$) with the second smallest eigenvalue for each correlation value. Each computed eigenvalue is then sorted using an ascending order to identify a desired permutation for memory layout in the global memory device.

In step 36, the executable binary file is modifies to allocate the memory layout as determined in step 35

The techniques described herein identify pairs of signal variables utilizing memory locations of the RAM that are executed in close proximity to one another (i.e., executable instructions substantially adjacent to one another). Adjacent memory locations are assigned to the signal variables that are determined to be in close proximity to one another in the executable instructions. In this manner, respective signal variables that executed frequently and substantially sequentially are assigned substantially close memory locations in the global memory device which reduces the processing time of CPU attempting to search and find the respective memory locations. As a result, the technique described herein efficiently assigns memory layouts to respective signal variables of executable instructions close to one another to reduce processing time. This improves the efficiency of the CPU and reduces bottlenecks.

While certain embodiments of the present invention have been described in detail, those familiar with the art to which this invention relates will recognize various alternative designs and embodiments for practicing the invention as defined by the following claims.

What is claimed is:

1. A method of ordering memory access by an instruction cache of a central processing unit on a global memory device comprising:
   extracting a signal list of a link map file in the global memory device;
   obtaining memory access traces relating to executed tasks from the signal list;
   identifying memory locations accessed in the global memory device from the access traces;
   determining a correlation value for each pair of memory locations accessed in the global memory device, wherein the correlation values are computed based on a proximity of executable instructions utilizing the respective pair of memory locations, including generating a correlation matrix wherein each memory location is cross referenced with another of the memory locations;
   reordering accessed memory locations within the global memory device as a function of the determined correlation values;
   reordering the correlation matrix to obtain a desired permutation that includes a diagonal row of entries each having a correlation value of zero, wherein the respective correlation values having a highest value among each of the correlation values of the correlation matrix are positioned closest to the zero diagonal entries; and
   modifying an executable file accessing the global memory device, the executable file optimizing the memory layout when accessing the global memory device.

2. The method of claim 1 wherein determining correlation values of the pairs of memory locations further comprises:
   determining a correlation value for each respective pair of memory locations accessed by respective executable instructions, wherein each correlation value is a weighted value based on a proximity of the respective executable instructions relative to one another in an instruction execution stream.

3. The method of claim 2 wherein the weighted value is further determined as a function of a frequency of accessing each respective pair of memory locations by the respective executable instructions.

4. The method of claim 3 wherein the weighted value is normalized.

5. The method of claim 4 wherein the weighted value is normalized by the following normalization function:

if $|ADDR\ X - ADDR\ Y| < S$, $w_{ab} = w_{ab} + 1$ where ADDR X is a first address accessed in the global memory, ADDR Y is a second address accessed in the global memory, S is a predetermined byte size, and $w_{ab}$ and the weighted value for the paired memory locations in the correlation matrix.

6. The method of claim 2 wherein the correlation values decrease as the entries transition away from the zero diagonal entries.

7. The method of claim 6 wherein the correlation values of the permutated correlation matrix are input in a minimum energy function for determining an optimum access memory layout.

8. The method of claim 7 wherein the minimum energy function is represented by the following equation:

$\min J(\pi) = \sum_{l=1}^{N-1} l^2 \sum_{i=1}^{N-l} w_{\pi i, \pi_{i+l}}$

9. The method of claim 8 wherein an inverse permutation of the minimum energy function is used to determine the memory layout, the inverse permutation represented by the following equation:

$$\min_{\pi^{-1}} J(\pi^{-1}) = \sum_{a,b} (\pi_a^{-1} - \pi_b^{-1})^2 w_{ab}.$$

10. The method of claim 9 wherein the minimum energy function is solved by determining an eigenvector ($q_2$) representative of a second smallest value utilizing the following eigen equation:

$(D-W)q = \lambda Dq.$ where the Laplacian matrix is L=D−W, the degree matrix D is a diagonal defined as $$d_{ij} = \begin{cases} \sum_i w_{ij}, & i = j \\ 0, & \text{Otherwise} \end{cases}.$$

11. The method of claim 10 wherein reordering the memory location within the global memory device includes sorting each of the determined second smallest eigenvalues ($q_2$) in ascending order to determine the desired permutation.

* * * * *